United States Patent [19]
Feth

[11] Patent Number: 6,126,326
[45] Date of Patent: Oct. 3, 2000

[54] OPTICAL CIRCUIT AND METHODS OF MANUFACTURING AND STOWING AN OPTICAL CIRCUIT

[75] Inventor: John R. Feth, Phoenix, Ariz.

[73] Assignee: Honeywell Inc., Morristown, N.J.

[21] Appl. No.: 09/188,839

[22] Filed: Nov. 9, 1998

[51] Int. Cl.[7] .................................................. G02B 6/255
[52] U.S. Cl. .............................. 385/96; 383/97; 383/98; 383/99
[58] Field of Search ................................. 385/96, 97, 98, 385/99

[56] References Cited

U.S. PATENT DOCUMENTS

| | | |
|---|---|---|
| 4,449,781 | 5/1984 | Lightstone et al. . |
| 4,726,643 | 2/1988 | Imoto et al. . |
| 5,274,724 | 12/1993 | Brehm et al. . |
| 5,278,933 | 1/1994 | Hunsinger et al. . |
| 5,347,606 | 9/1994 | Johansen . |
| 5,351,331 | 9/1994 | Chun et al. . |
| 5,384,878 | 1/1995 | Osaka et al. . |

*Primary Examiner*—Hemang Sanghavi
*Assistant Examiner*—Benjamin Cushwa
*Attorney, Agent, or Firm*—Kris T. Fredrick

[57] ABSTRACT

An optical circuit comprising first and second fiber optic components, an optical fiber having a first end coupled with the first fiber optic component and a second end coupled with the second fiber optic component, and a helical strand of the optical fiber intermediate the first and second components.

11 Claims, 2 Drawing Sheets

OPTICAL CIRCUIT AND METHODS OF MANUFACTURING AND STOWING AN OPTICAL CIRCUIT

TECHNICAL FIELD

This invention relates generally to the field of fiber optics and, more particularly, to optical circuitry and methods of manufacturing and stowing optical circuitry.

BACKGROUND ART

Optical fibers used in sensors and other optical circuits that use concatenated segments require stable alignments between the segments to ensure and maintain exemplary circuit performance. Fusion splicing, a controlled heating and joining of the segment ends, provides this stability in the x, y, and z dimensions, and in rotational azimuth around the fiber axis.

Optical fibers may be fusion spliced together to form an optical circuit between optical components. After fusion splicing optical components together to form an optical circuit, a length of optical fiber naturally separates the optical components. For most developmental circuits, the length and disposition of the optical fiber between the optical components is of little consequence. However, for fiber optic sensors, which may contain optical sources, detectors, electronic circuitry and a few kilometers of fiber in packages of only 100 cubic inches, providing space for the fiber interconnecting components has proven difficult.

Accordingly, it would be highly desirable to provide a new and improved optical circuit and new and improved methods of manufacturing and stowing an optical circuit.

It is a purpose of the present invention to provide a new and improved optical circuit that is compact and easy to stow.

It is another purpose of the present invention to provide new and improved methods of manufacturing and stowing an optical circuit that are easy to implement.

It is another purpose of the present invention to provide new and improved methods of manufacturing and stowing an optical circuit that are reliable.

It is still another purpose of the present invention to provide new and improved methods of manufacturing and stowing an optical circuit that are highly efficient.

It is a further purpose of the present invention to minimize the impact of optical fiber stowage on the mechanical layout of fiber optic sensors and other apparatus having fiber optic circuitry.

DISCLOSURE OF THE INVENTION

The above problems and others are at least partially solved and the above purposes and others are realized in a new and improved circuit architecture and new and improved methods of manufacturing and stowing circuitry. An exemplary method of manufacturing and stowing an optical circuit may generally comprise the steps of providing first and second components each including a lead having a twist bias and a free end, spacing the first and second components in substantially opposing relation, joining the free ends of the leads together and moving the first and second components together to cause the twist bias of the leads to cooperate and form a double helix or helical strand. In a preferred embodiment, the first and second components may each comprise an optical component, and the leads may each comprise an optical fiber lead. In this regard, the free ends of the leads may be joined together by conventional fusion splicing techniques.

BRIEF DESCRIPTION OF THE DREWINGS

The foregoing and further and more specific objects and advantages of the instant invention will become readily apparent to those skilled in the art from the following detailed description thereof taken in conjunction with the drawings in which.

BEST MODE FOR CARRYING OUT THE INVENTION

The present invention provides, among other things, a new and improved optical circuit architecture and new and improved methods of manufacturing and stowing optical circuitry. Ensuing embodiments of the present invention are easy and inexpensive to construct and implement, and prove particularly useful in the manufacture and stowage of optical fiber circuitry for use in optical sensors.

Figure 1:
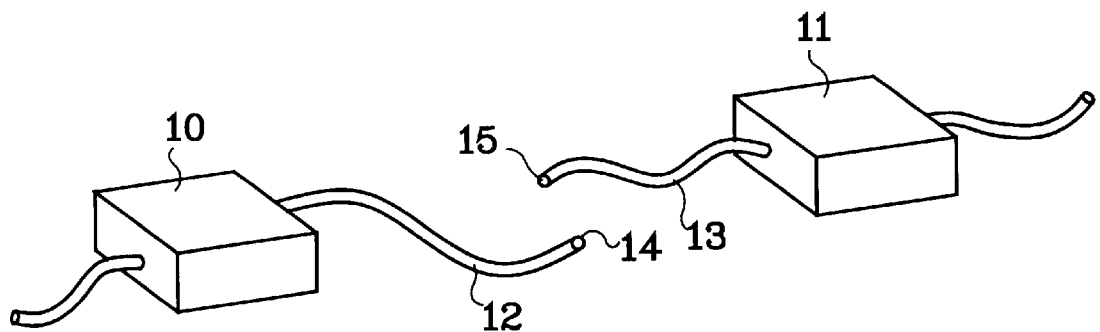
FIG. 1 illustrates an isometric view of first and second components each including a lead having a free end.

Turning now to the drawings, in which like reference characters indicate corresponding elements throughout the several views, attention is directed to FIG. 1 which illustrates an isometric view of first and second components 10 and 11 each including a lead, 12 and 13, each having a free end, 14 and 15, respectively. In accordance with a preferred disclosure, first and second components 10 and 11 each comprise a fiber optic component, and leads 12 and 13 each comprise an optical fiber lead. To create an optical circuit, it is necessary to join, such as by fusion splicing, free ends 14 and 15 together. Yet prior to joining free ends, 14 and 15, together in accordance with a particular embodiment, the present invention first provides introducing a twist bias into one or both of leads 12 and 13.

Figure 2:
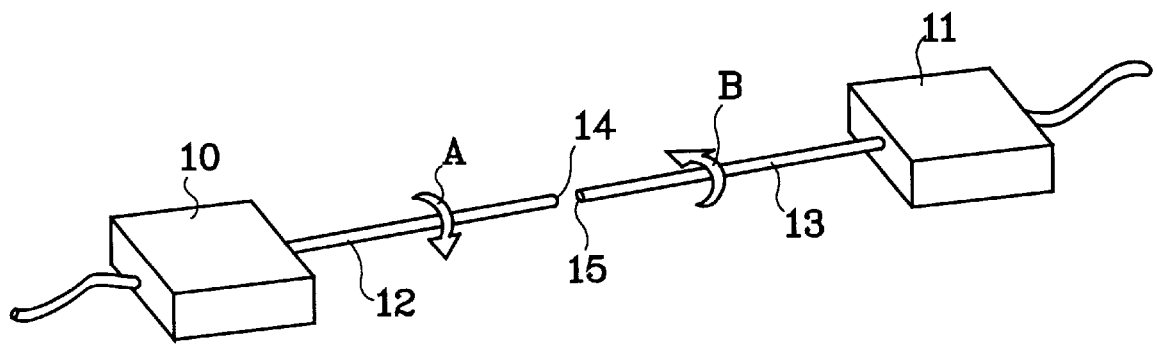
FIG. 2 illustrates an isometric view of the first and second components of FIG. 1 with each lead shown having a twist bias.

To introduce a twist bias into lead 12, one may twist or otherwise wind lead 12 substantially along its longitudinal axis and relative to first component 10, and, in the alternative, twist or otherwise wind first component 10 relative to lead 12 and substantially about the longitudinal axis of lead 12. To similarly introduce a twist bias into lead 13, one may twist or otherwise wind lead 13 substantially along its longitudinal axis and relative to second component 11, and, in the alternative, twist or otherwise wind second component 11 relative to lead 13 and substantially along the longitudinal axis of lead 13. Because leads 12 and 13 each comprise an optical fiber lead in accordance with the present discussion, each exhibits a supple yet resilient character which permits easy introduction of a twist bias in any one of the foregoing manners. In accordance with a preferred embodiment, it is desirable that with free ends 14 and 15 situated in substantially opposing relation as shown in FIG. 2, the twist bias carried by leads 12 and 13 bias in opposite directions as evinced by the arcuate arrowed lines A and B, respectively. In this regard, a twist bias is determined by looking into the free end of the fiber lead and determining the direction or sense of the applied twist. Looking to FIG. 2 in accordance with this principle, twists evinced by the arcuate arrowed lines A and B are both of the same sense in the counterclockwise direction, although each twist may be provided in the clockwise direction if so desired.

Figure 3:
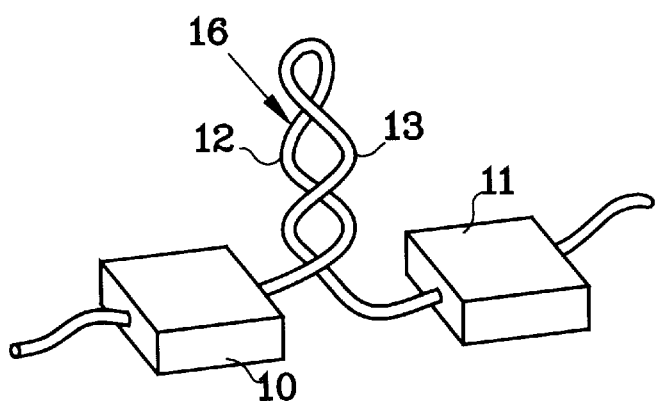
FIG. 3 illustrates an isometric view of the first and second components of FIG. 2 with the free ends of the lead coupled together and the twist bias of each lead cooperating to form a helical strand.

With first and second components 10 and 11 situated in spaced-apart and substantially opposing relation, with free ends 14 and 15 similarly situated in spacedapart and substantially opposing relation as shown in FIG. 2, and with the-twist bias of each lead, 12 and 13, locked or otherwise held in place, free ends 14 and 15 may be joined together by a conventional fusion splicing technique. Once joined, the present invention further provides moving first and second components 10 and 11 together. As the first and second components 10 and 11 are moved together, the twist biases carried by each lead, 12 and 13, cooperate to assemble the lead length separating first and second components 10 and 11 into a double helix or helical strand 16 which situates in an orientation substantially normal to first and second components 10 and 11 as shown in FIG. 3. A twist bias introduced into only one of leads 12 and 13 is sufficient to cause formation of double helix 16.

Figure 4:
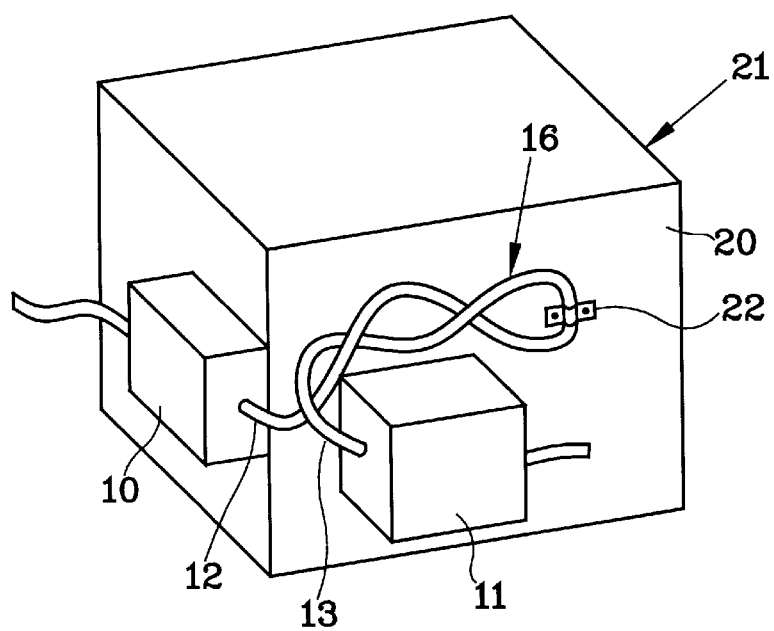
FIG. 4 illustrates a view somewhat similar to the view of FIG. 3 with the first and second components shown carried by a housing and the helical strand shown as it would appear stowed in the housing.

Double helix 16 takes up the lead length between first and second components 10 and 11 in a very compact, straight and narrow twisted loop. As a result, the formation or assemblage of double helix 16 functions as a stowage mechanism for the lead length separating first and second components 10 and 11. In this regard, FIG. 4 shows first and second components 10 and 11 as they may appear carried by a housing 20 of, for instance, an optical sensor 21, with the lead length separating first and second components 10 and 11 stowed in the form of double helix 16. Because of its shape, double helix 16 may be fastened to housing 20 with a bracket 22, a suitable adhesive or other selected fastening mechanism for efficient storage.

Figure 5:
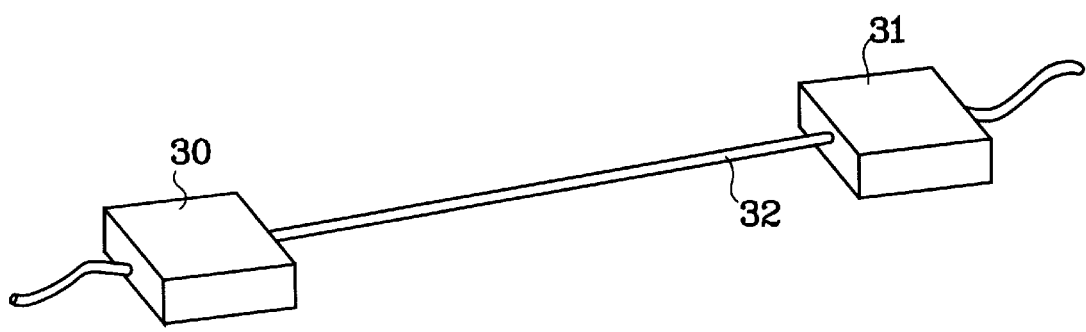
FIG. 5 illustrates an isometric view of a first component, a second component and a lead separating the first and second components.

Although a twist bias may be introduced into the leads of, for instance, optical components prior to joining the leads together, the fabrication of a helical strand may be carried out after the leads have been joined. In this regard, FIG. 5 illustrates an isometric view of first and second components 30 and 31 separated by a lead 32. Like the preceding discussion of FIGS. 1-4, first and second components 30 and 31 may each comprise an optical component and lead 32 a length of optical fiber. To stow the length of lead 32, one of first and second components 30 and 31 may be grasped and, while holding the other one of the first and second components 30 and 31 stationary, rotated substantially along the axis of lead 32 to impart a twist bias into lead 32. First and second components 30 and 31 may then be moved together to cause the twist bias carried by lead 32 to assemble lead 32 into a helical strand. In order to introduce a twist bias into lead 32 in accordance with another embodiment, first and second components 30 and 31 may each be grasped and rotated on opposite rotational directions substantially along the axis of lead 32 to introduce a twist bias into lead 32.

The present invention has been described above with reference to a preferred embodiment. However, those skilled in the art will recognize that changes and modifications may be made in the described embodiments without departing from the nature and scope of the present invention. For instance, although the leads 12, 13 and 32 each comprise an optical fiber, the present invention may be used with non-optical fiber circuitry and, accordingly, non-optical leads having a supple and resilient character substantially like that of conventional optical fiber. Various changes and modifications to the embodiment herein chosen for purposes of illustration will readily occur to those skilled in the art. To the extent that such modifications and variations do not depart from the spirit of the invention, they are intended to be included within the scope thereof, which is assessed only by a fair interpretation of the following claims.

Having fully described the invention in such clear and concise terms as to enable those skilled in the art to understand and practice the same, the invention claimed is:

1. A method of manufacturing an optical circuit, comprising the steps of:

providing first and second optical components each including a lead having a free end;

introducing a twist bias into at least one of the leads;

spacing the first and second optical components in substantially opposing relation;

joining the free ends of the leads together; and moving the first and second optical components together to cause the twist bias to form a double helix.

2. The method of claim 1, wherein the step of joining the free ends of the leads together further includes the step of fusion splicing the free ends of the leads together.

3. A method of manufacturing a circuit, comprising the steps of:

providing first and second components each including an optical fiber lead having a twist bias and a free end;

spacing the first and second components in substantially opposing relation;

joining the free ends of the optical fiber leads together; and moving the first and second components together to cause the twist bias of the optical fiber leads to cooperate and form a double helix.

4. The method of claim 1, wherein the step of joining the free ends of the optical fiber leads together further includes the step of fusion splicing the free ends of the optical fiber leads together.

5. A method of manufacturing a circuit, comprising the steps of:

providing first and second components each including a lead having a free end;

imparting a twist bias to at least one of the leads;

joining the free ends together; and moving the first and second components together to cause the twist bias to form a double helix.

6. The method of claim 5, wherein the step of joining the free ends together further includes the step of fusion splicing the free ends together.

7. A method of manufacturing a circuit, comprising the steps of:

providing a first component having a first optical fiber lead and a free end, and a second component including a second optical fiber lead and a free end;

imparting a twist bias to the first optical fiber lead;

imparting a twist bias to the second optical fiber lead;

joining the free ends of the first and second optical fiber leads together; and moving the first and second components together to cause the twist bias of the first and second optical fiber leads to cooperate and form a double helix.

8. The method of claim 7, wherein the step of joining the free ends of the first and second optical fiber leads together further includes the step of fusion splicing the free ends of the first and second optical fiber leads together.

9. The method of claim 7, wherein the step of imparting a twist bias to the first optical fiber lead further includes the steps of twisting one of the first component and the first optical fiber lead.

10. The method of claim 7, wherein the step of imparting a twist bias to the second optical fiber lead further includes the steps of twisting one of the second component and the second optical fiber lead.

11. In an optical circuit comprising first and second optical components interconnected by an optical fiber, a method of stowing the optical fiber, comprising the steps of:

twisting at least one of the first and second optical components relative to the other one of the first and second optical components to impart a twist bias into the optical fiber; and moving the first and second optical components together to cause the twist bias to form a double helix in the optical fiber.

\* \* \* \* \*

UNITED STATES PATENT AND TRADEMARK OFFICE
CERTIFICATE OF CORRECTION

PATENT NO. : 6,126,326
DATED : October 3, 2000
INVENTOR(S) : John R. Feth

It is certified that error appears in the above-identified patent and that said Letters Patent is hereby corrected as shown below:

Column 1, Line 5, after "TECHNICAL FIELD" insert the following paragraph:

The U.S. Government has certain rights in this invention pursuant to Contract No. DAAH01-95-C-R147, awarded by the Department of the U.S. Army Missile Command.

Signed and Sealed this

Eighth Day of May, 2001

*Attest:*

NICHOLAS P. GODICI

*Attesting Officer*   *Acting Director of the United States Patent and Trademark Office*